United States Patent [19]

Strait

[11] Patent Number: 5,642,969

[45] Date of Patent: Jul. 1, 1997

[54] PORTABLE MACHINE TOOL

[75] Inventor: David S. Strait, Lyle, Wash.

[73] Assignee: Climax Portable Machine Tools, Inc., Newberg, Oreg.

[21] Appl. No.: 502,311

[22] Filed: Jul. 13, 1995

[51] Int. Cl.$^6$ .................................................... B23B 41/00
[52] U.S. Cl. ........................ 408/124; 408/129; 408/132; 408/141; 82/1.4
[58] Field of Search .................................. 408/124, 129, 408/132, 134, 72 R, 708, 141; 82/1.4

[56] References Cited

U.S. PATENT DOCUMENTS

| | | | |
|---|---|---|---|
| 577,656 | 2/1897 | Hendrickson | 408/124 |
| 809,257 | 1/1906 | Hanson | 408/141 |
| 1,740,887 | 12/1929 | Crosby | 408/141 |
| 1,823,642 | 9/1931 | Brown et al. | |
| 2,900,858 | 8/1959 | Gauthier et al. | |
| 3,083,600 | 4/1963 | Rhindress | |
| 3,101,014 | 8/1963 | Rowe et al. | 408/124 |
| 3,135,137 | 6/1964 | Cunningham | 408/124 |
| 3,537,341 | 11/1970 | Zahuranec et al. | |
| 4,406,566 | 9/1983 | Bauer | 408/134 X |
| 4,440,050 | 4/1984 | Kagerer | |
| 4,483,223 | 11/1984 | Nall et al. | |
| 4,495,842 | 1/1985 | Starta et al. | |
| 4,580,931 | 4/1986 | Wilger et al. | |
| 4,652,186 | 3/1987 | Sverdlin | |
| 4,656,898 | 4/1987 | Hunt et al. | |
| 4,813,314 | 3/1989 | Kwech | |
| 4,850,756 | 7/1989 | Dubois | |
| 4,944,205 | 7/1990 | Ricci | |
| 4,981,055 | 1/1991 | VanderPol et al. | 82/128 X |
| 4,990,037 | 2/1991 | Strait | |

Primary Examiner—M. Rachuba
Assistant Examiner—Henry W. H. Tsai
Attorney, Agent, or Firm—Smith-Hill and Bedell

[57] ABSTRACT

A machine tool comprises a mounting member for attachment to a workpiece. The mounting member includes a bearing portion that has an external surface of circular cross section and is formed with an aperture in its external surface. A utility device has an internal peripheral surface that defines a cylindrical cavity for receiving the bearing portion of the mounting member in a manner that allows the utility device to move axially and rotationally relative to the mounting member. A clamp is actuable when the utility device is fitted to the bearing portion of the mounting member for releasably retaining the utility device against axial and rotational movement relative to the bearing portion. A spring-loaded detent member projects into the cylindrical cavity from the peripheral surface and is receivable in the aperture of the bearing portion for retaining the operating assembly against axial and rotational movement relative to the bearing portion in the event that the clamp is not actuated.

21 Claims, 6 Drawing Sheets

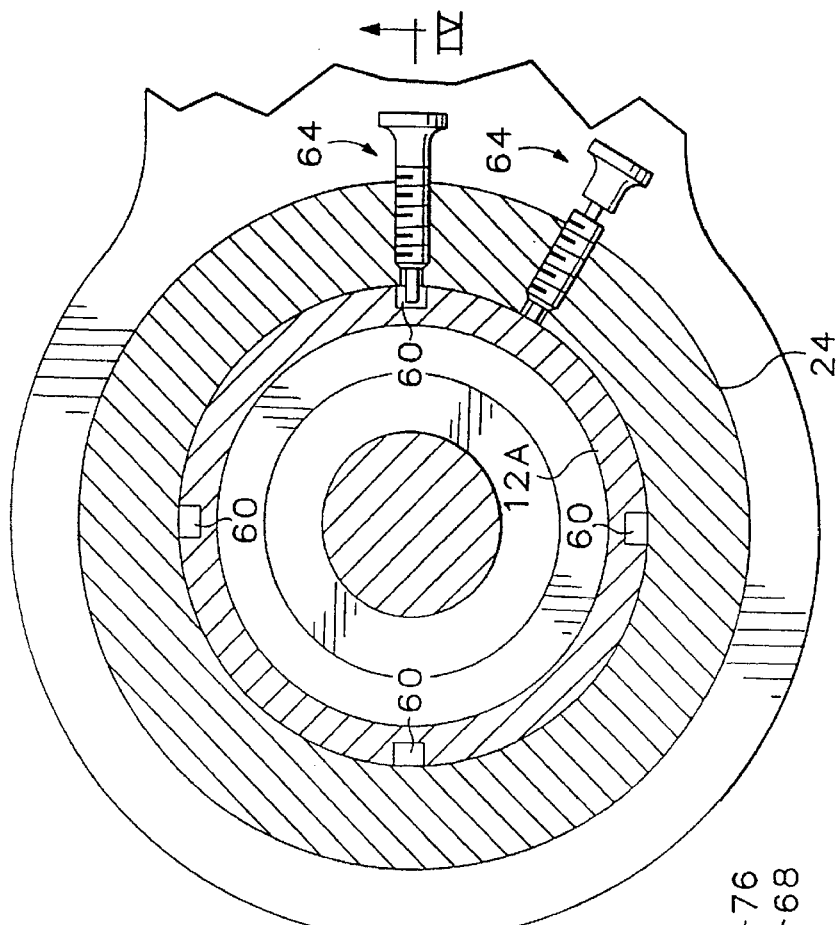
FIG. 3
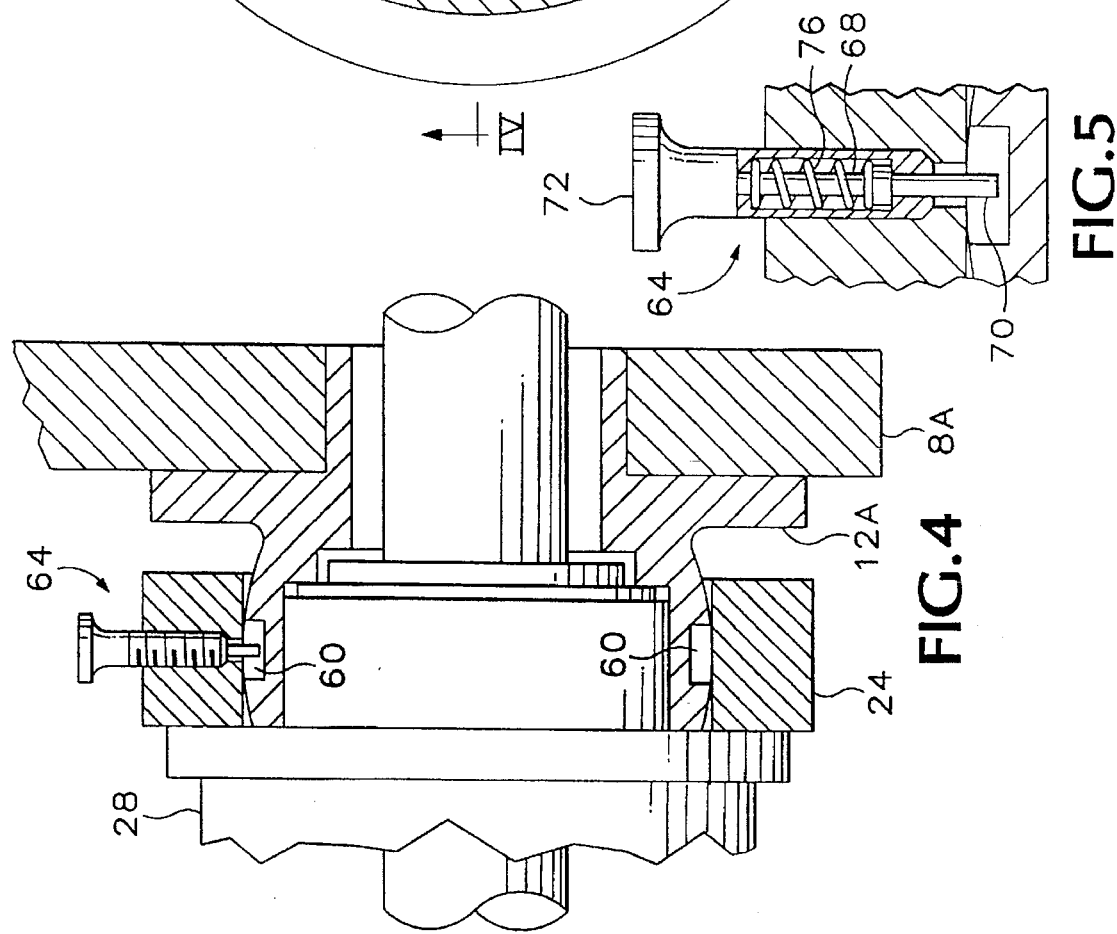
FIG. 5
FIG. 4

PORTABLE MACHINE TOOL

BACKGROUND OF THE INVENTION

This invention relates to a portable machine tool.

The Model BB1149 Portable Boring Bar sold by Climax Portable Machine Tools, Inc. of Newberg, Oregon is a portable boring machine that is used for boring out a hole in a workpiece to a desired diameter and with its axis at a desired orientation. Referring to FIG. 1 of the drawings, spacer plates 4A and 4B are tack welded to opposite sides of the workpiece (not shown) and mounting brackets 8A and 8B are attached to the spacer plates respectively using screws. Each mounting bracket includes a ring portion that defines a circular aperture. The manner in which the mounting brackets are attached to the spacer plates allows movement of the mounting brackets relative to the spacer plates, and the mounting brackets are initially positioned so that the centers of the two circular apertures lie at least approximately on the desired central axis of the final bore. A mounting bearing 12 is attached to each mounting bracket in a manner allowing limited movement of the mounting bearing relative to the mounting bracket. The assembly of the mounting bearing and mounting bracket may be as shown in U.S. Pat. No. 4,990,037, the disclosure of which is hereby incorporated by reference herein. As shown in U.S. Pat. No. 4,990,037, the mounting bearing is generally cylindrical, having a central axis, and defines a passage through which an elongate boring bar extends with clearance. A collar defines a bore through which the boring bar extends with a snug fit allowing rotational and axial relative movement, and a spherical bearing is effective between the collar and the mounting bearing and allows the collar to pivot relative to the mounting bearing about a point that lies on the central axis of the mounting bearing. The mounting bearing has a spherical external bearing surface, and the center of curvature of the spherical bearing surface coincides with the center of pivotal movement of the collar relative to the mounting bearing.

Referring again to FIG. 1, the boring bar, which is designated 16 in FIG. 1, is fitted through the mounting bearings 12, and the positions of the mounting bearings are adjusted relative to the mounting brackets so that the central axis of the boring bar lies on the desired central axis of the final bore. A rotational drive assembly 22 is fitted on the boring bar. The rotational drive assembly includes a clamp ring 24 that defines a cylindrical mounting cavity. When the rotational drive assembly is fitted on the boring bar, the mounting bearing 12A is received in the cylindrical mounting cavity of the clamp ring 24, and the clamp ring 24 is then tightened. In this manner, the rotational drive assembly 22 is secured to the workpiece. The spherical configuration of the external bearing surface of the mounting bearing 12A allows the clamp ring to be tightened firmly against the bearing surface even if the central axis of the boring bar does not coincide with the central axis of the mounting bearing. The rotational drive assembly includes a motor 28 that is coupled through gearing (not shown) to a drive collet 32 that is fitted on the boring bar and is keyed thereto. Thus, when power is supplied to the motor, the boring bar is driven to rotate relative to the rotational drive assembly.

An axial feed assembly 40 is also fitted on the boring bar 16. The axial feed assembly includes a housing 44 that is coupled to the rotational drive assembly through a lead screw 48 that is parallel to the boring bar and holds the housing 44 against rotation relative to the rotational drive assembly. The housing 44 contains a feed collet 52 that is rotatable within the housing 44 but is held against axial movement relative to the housing. The feed collet 52 is clamped to the boring bar 16, whereby the housing 44 is held against axial movement relative to the boring bar and the feed collet is driven to rotate inside the housing 44. The feed collet is drivingly coupled to a lead nut that is in threaded engagement with the lead screw 48. As the feed collet is rotated, the lead nut rotates and the axial feed assembly is moved toward or away from the rotational drive assembly. Thus, the boring bar is moved axially relative to the workpiece.

Proper installation of the portable boring machine is a demanding task, and it is sometimes necessary that the machine be installed in a confined space. In these circumstances, it is possible that the operator will find it difficult or inconvenient to tighten the clamp ring 24 that secures the rotational drive assembly to the mounting bearing 12A while maintaining a firm grip on the rotational drive assembly.

When the Model BB1149 Portable Boring Bar is in use, there is a possibility that the operator will not be attentive and the axial feed of the boring bar will be such that the toolhead, which is mounted on the boring bar, passes beyond the workpiece and collides with the mounting bracket or other environmental structure. This may cause damage to the boring machine or other structures.

SUMMARY OF THE INVENTION

In accordance with a first aspect of the invention there is provided a machine tool comprising a mounting member for attachment to a workpiece, the mounting member including a bearing portion that has an external surface of circular cross section and is formed with at least one aperture in its external surface, and a utility device having an internal peripheral surface that defines a cylindrical cavity for receiving the bearing portion of the mounting member in a manner that allows the utility device to move axially and rotationally relative to the mounting member, a clamp means actuable when the utility device is fitted to the bearing portion of the mounting member for releasably retaining the utility device against axial and rotational movement relative to the bearing portion, and at least one spring-loaded detent member that projects into the cylindrical cavity from said peripheral surface and is receivable in the aperture of the bearing portion for retaining the operating assembly against axial and rotational movement relative to the bearing portion in the event that the clamp means is not actuated.

In accordance with a second aspect of the invention there is provided a machine tool for boring out a hole in a workpiece, comprising a boring bar, at least one mounting member for attachment to the workpiece to support the boring bar, the mounting member being generally cylindrical and defining a passage for receiving the boring bar, and including a bearing portion that has an external surface of circular cross section and is formed with at least one aperture in its external surface, and a rotational drive assembly including a motor in driving engagement with the boring bar, an attachment portion having an internal peripheral surface that defines a cylindrical cavity for receiving the bearing portion of the mounting member in a manner that allows the attachment portion to move axially and rotationally relative to the mounting member, a clamp means actuable when the attachment portion is fitted to the bearing portion of the mounting member for releasably retaining the attachment portion against axial and rotational movement relative to the bearing portion, and at least one spring-loaded detent member that projects into the cylindrical cavity from said peripheral surface and is receivable in the aperture of the bearing portion for retaining the attachment portion against axial and rotational movement relative to the bearing portion in the event that the clamp means is not actuated.

In accordance with a third aspect of the invention there is provided a portable machine tool comprising a bar having a central axis, a rotational drive assembly effective between the bar and a mechanical ground for rotating the bar about said axis, an axial feed assembly mounted on the bar in a manner that prevents relative axial movement, said axial feed assembly including a housing, a drive member that is mounted in the housing and is held against axial movement relative to the housing and rotational movement relative to the bar, an output member that is rotatable in the housing about an axis that is parallel to the bar and is held against axial movement relative to the housing, and a means for converting relative rotational movement of the bar and the axial feed assembly into rotational movement of the output member in the housing, a coupling member effective between the mechanical ground and the axial feed assembly, the coupling member being drivingly engaged by the output member whereby relative axial movement of the axial feed assembly and the rotational drive assembly is effected in response to relative rotational movement of the bar and the axial feed assembly, an axial feed stop at a selected position along the coupling member, and a means responsive to the axial feed stop for disconnecting the coupling between the bar and the output member.

BRIEF DESCRIPTION OF THE DRAWINGS

For a better understanding of the invention, and to show how the same may be carried into effect, reference will now be made, by way of example, to the accompanying drawings, in which FIG. 3 is a sectional view taken on the line III—III of FIG. 2, FIG. 4 is a sectional view taken on the line IV—IV of FIG. 3, FIG. 5 is an enlarged sectional view of a detail of FIG. 4.

In the several figures of the drawings, like reference numerals designate corresponding elements.

DETAILED DESCRIPTION

Figure 1:
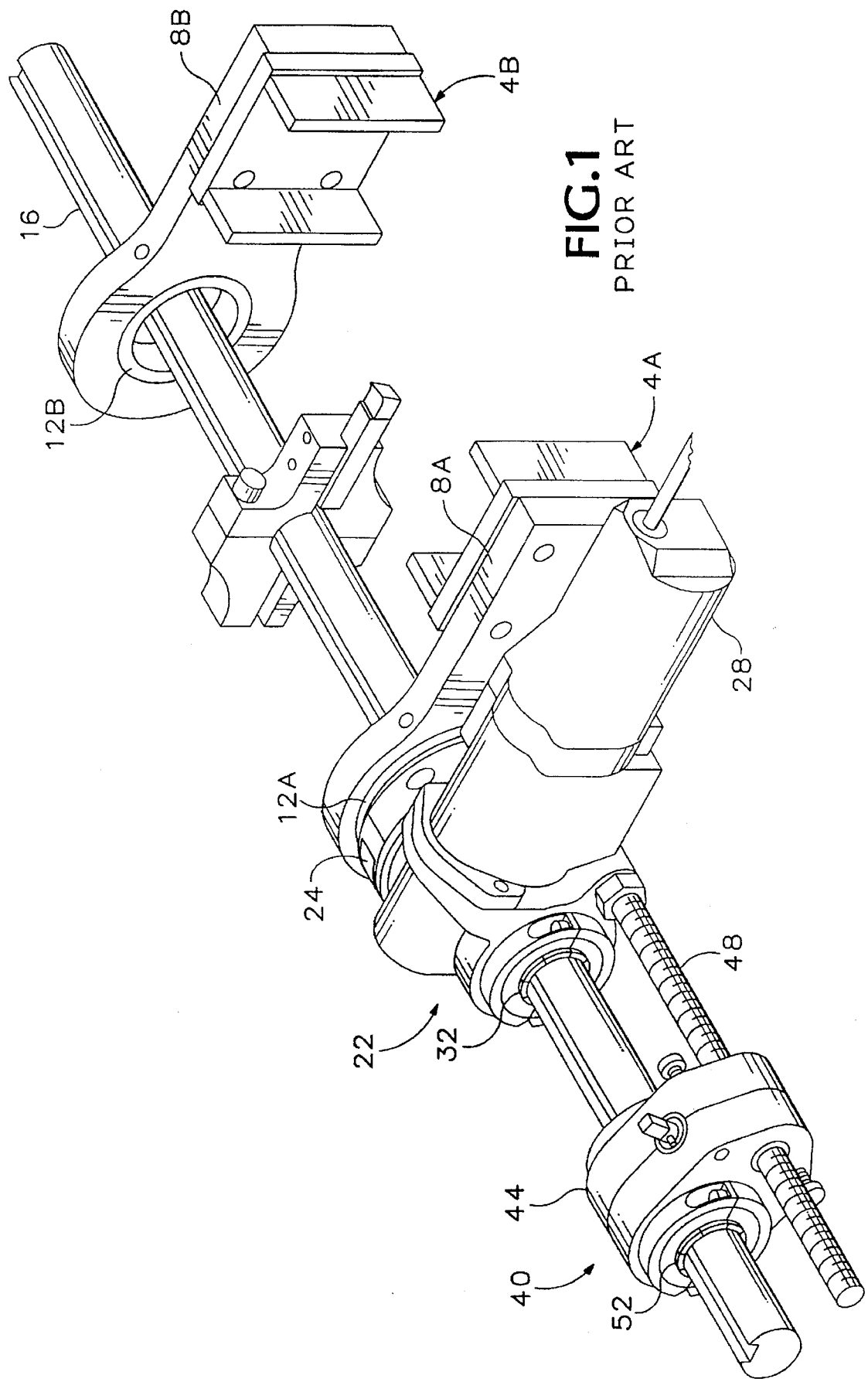
FIG. 1 is a perspective view of a known type of portable boring machine.

The portable boring machine shown in FIGS. 2–8 is similar to the machine shown in FIG. 1 except with respect to the axial feed assembly and the manner in which the rotational drive assembly is mounted to the mounting bearing 12A.

As shown in FIGS. 3 and 4, the mounting bearing 12A is formed with four slots or recesses 60 in its external spherical surface. The slots 60 are shown in FIGS. 3–5 as being blind, but they could extend right through the mounting bearing if necessary or desirable. The four slots are equiangularly distributed about the central axis of the mounting bearing, which is defined by the cylindrical passage through the mounting bearing. Each slot is elongated and extends parallel to the central axis of the mounting bearing and spans a portion of the external spherical surface of the mounting bearing that is at the maximum radial distance from the central axis of the mounting bearing. The clamp ring 24 of the rotational drive assembly is provided with two radial passages that are angularly spaced at 30° about the central axis of the clamp ring, and each passage accommodates a detent mechanism 64. The detent mechanism 64, which is shown in greater detail in FIG. 5, comprises a detent pin 68 having an inner end 70 and an outer end that projects outwardly beyond the clamp ring and is provided with a knob 72. A spring 76 urges the pin 68 radially inward, toward a position in which the inner end 70 projects into the cylindrical cavity that is defined by the interior surface of the clamp ring 24.

When the rotational drive assembly is applied to the mounting bearing 12A, the wedging action of the spherical external surface of the mounting bearing against the inner ends of the detent pins pushes the detent pins radially outward against the force of the springs 76. In general, neither detent pin will be aligned with one of the slots 60 when the rotational drive assembly is first fitted to the mounting bearing. However, the range of angular positions of the boring bar 16 relative to the central axis of the mounting bearing 12A, permitted by movement of the mounting bearing relative to the bracket 8A, is such that when the drive assembly 22 has been applied to the mounting bearing, the inner end of each detent pin is within the axial extent of the slots. Therefore, by rotating the rotational drive assembly through an angle of no more than 30° in either sense, the rotational drive assembly will be brought to a position in which the inner end of one of the detent pins 68 enters one of the slots 60. Because it is not necessary to rotate the rotational drive assembly through more than 30°, it is relatively easy, even under cramped conditions, to bring a pin into engagement with a slot. By engaging one of the pins 68 in one of the slots 60, the rotational drive assembly is locked against angular and axial movement relative to the mounting bearing, except as permitted by the small clearance of the inner end of the pin in the slot, and the operator can therefore tighten the clamp ring 24 onto the mounting bearing without needing to hold the rotational drive assembly in position. Engagement of the pin in the slot also prevents rotation of the drive assembly relative to the mounting bearing in the event that the drive motor is inadvertently switched on before the operator has tightened the clamp ring 24 onto the mounting bearing 12A. When it is necessary to remove the rotational drive assembly from the mounting bearing, the pin can easily be withdrawn from the slot by pulling the knob at the outer end of the pin radially away from the clamp ring.

Figure 6:
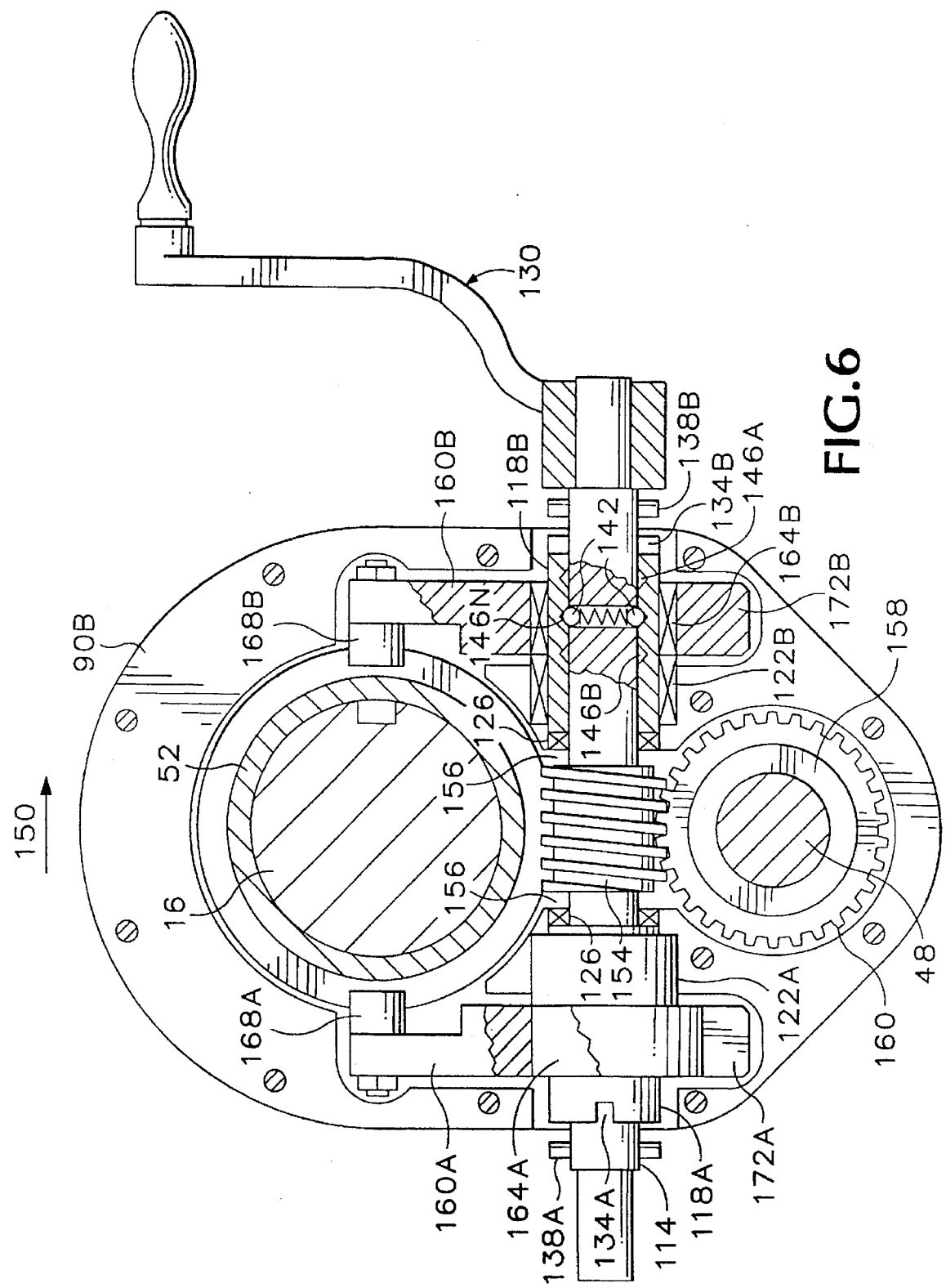
FIG. 6 is a sectional view of the axial feed assembly taken on the line VI—VI of FIG. 2.
Figure 7:
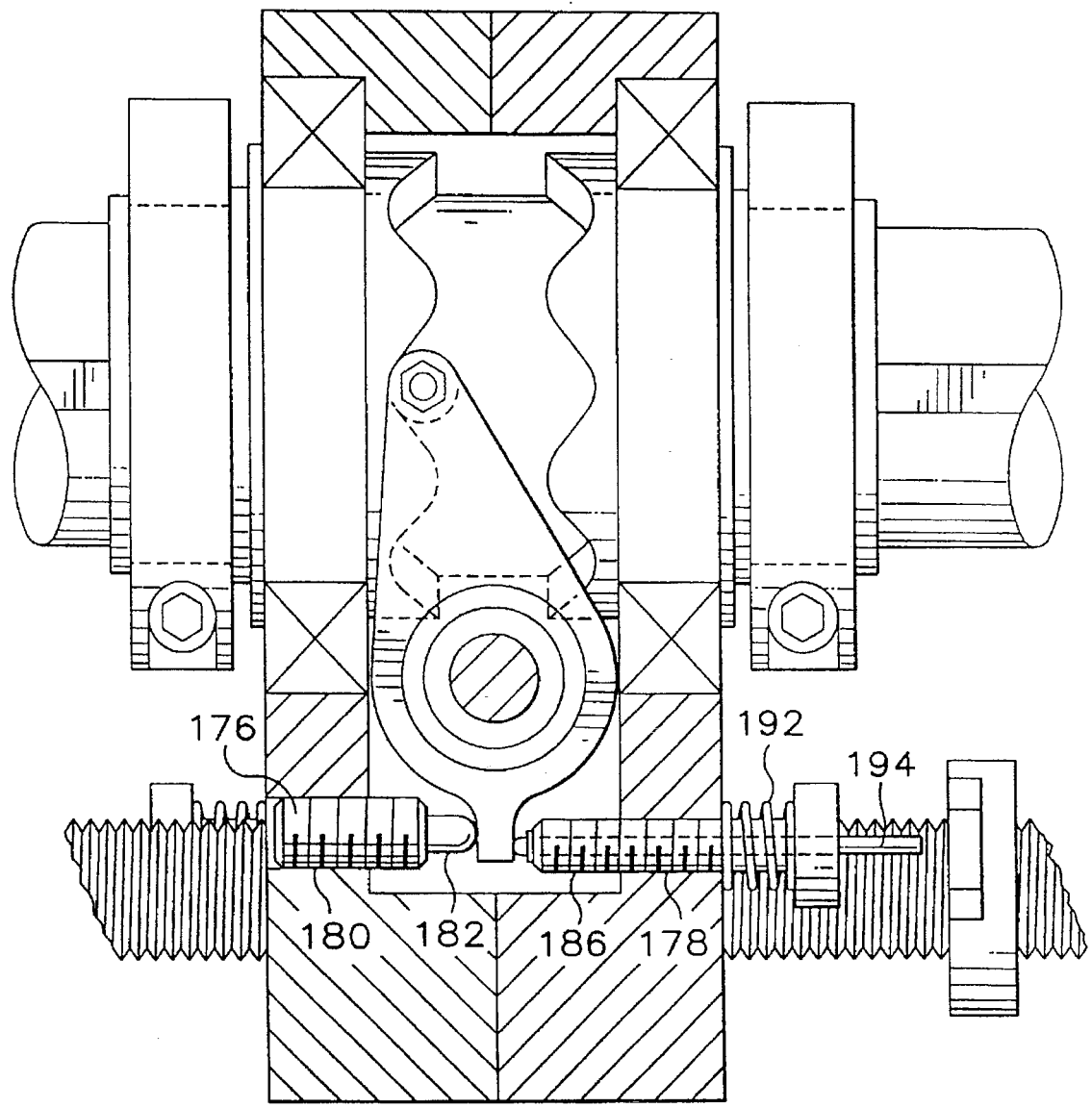
FIG. 7 is a sectional view of the axial feed assembly taken perpendicular to the plane of FIG. 6, showing the axial feed assembly in a first condition.
Figure 8:
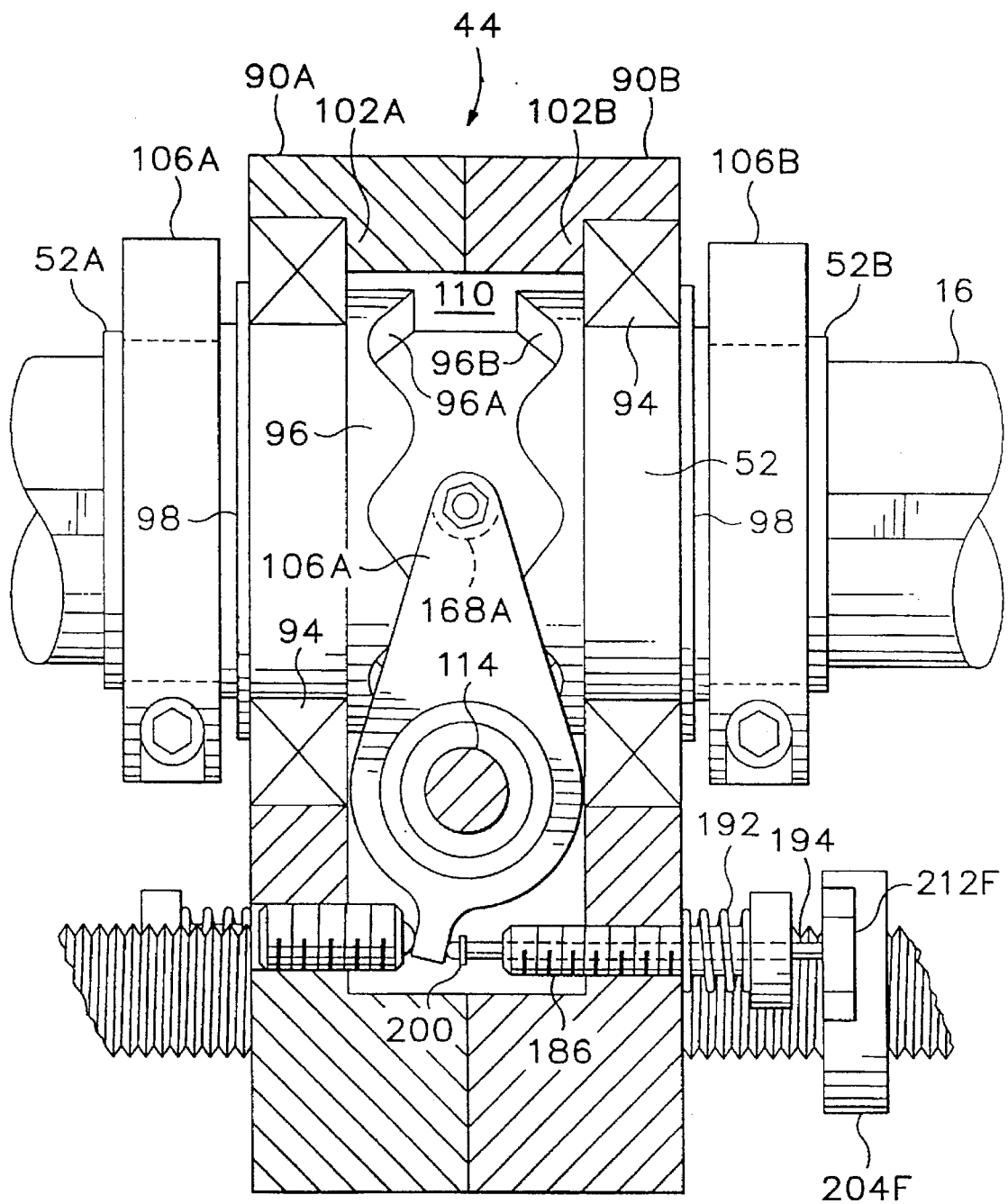
FIG. 8 is similar to FIG. 7 but shows the axial feed assembly in a second condition.

The housing 44 of the axial feed assembly shown in FIGS. 6–8 is composed of two identical shells 90A, 90B that are secured together by screws. The feed collet 52 through which the boring bar 16 extends is located in the housing 44 by ball bearings 94, which are held on the feed collet 52 between a wave cam ring 96 and snap rings 98 and engage shoulder parts 102A, 102B of the two shells 90A, 90B respectively. In this manner, the feed collet 52 is supported for rotation relative to the housing and held against axial movement relative thereto. The feed collet 52 has axial quill extensions 52A, 52B on which clamp collars 106A, 106B are fitted. By tightening the clamp collars 106, the feed collet is secured against movement relative to the boring bar and the housing 44 is thereby held against axial movement relative to the boring bar.

The wave cam ring 96 has two cam tracks 96A, 96B each composed of eight lobes. The two cam tracks are separated from one another axially of the boring bar by a slot 110.

Referring to FIG. 6 as well as FIG. 7, the axial feed assembly also comprises a feed shaft 114 that extends coaxially, with a close sliding fit, within drive bushings 118A and 118B. The drive bushings 118 are supported within the housing 44 by roller clutches 122A, 122B respectively, which are clamped between the two shells 90A, 90B. In this manner, the feed shaft 114 is supported perpendicular to the central axis of the boring bar 16. The bushings 118 are held against axial movement in the housing 90 by snap rings (not shown) engaging housing seals (not shown) at the outer ends of the bushings and thrust bearings 126 at the inner ends of the bushings. A crank handle 130 can be applied to either square section end of the feed shaft for manual rotation of the feed shaft.

The drive bushings 118 each have dogs at their outer end, defining slots 134 for receiving dowel pins 138 that project from the feed shaft 114. The feed shaft 114 is displacable longitudinally within the drive bushings 118 among three detented positions, defined by engagement of spring-loaded detent balls 142 with annular grooves 146N, 146A, and 146B in the bushing 118B. When the detent balls engage the groove 146N, as shown in FIG. 6, the dowel pins 138 are clear of the slots 134 and the drive bushings are free to rotate relative to the feed shaft 114. When the feed shaft is displaced in the direction of the arrow 150, so that the dowel pin 138A engages the slot 134A in the drive bushing 118A and therefore the bushing 118A and the feed shaft 114 are locked against rotation relative to each other, the detent balls are received in the groove 146A. Similarly, when the feed shaft is displaced in the opposite direction, so that the dowel pin 138B engages the slot 134B in the drive bushing 118B and the drive bushing and the feed shaft are locked against rotation relative to each other, the detent balls are received in the groove 146B.

A helical gear 154 is fitted on a hexagonal profile segment of the feed shaft and is located between two webs 156 of the housing 44. The gear 154 therefore does not interfere with displacement of the feed shaft 114 among its detented positions, and remains coupled to the feed shaft with respect to rotation thereof. Thrust bearings (not shown) are provided between the helical gear 154 and the webs 156.

The lead screw 48 extends through the housing 44 parallel to the boring bar 16, and an internally threaded lead screw nut 158, which is in threaded engagement with the lead screw 48, is fitted in the housing by bearings that allow the lead screw nut to rotate within the housing while holding it against axial movement. The lead screw nut has an external gear 160 that is in mesh with the helical gear 154.

Ratchet arms 160A and 160B extend from ratchet arm collars that are mounted on the bushings 118A and 118B respectively through roller clutches 164A and 164B. The ratchet arms 160A and 160B have cam follower bearings 168A, 168B at their free ends. The cam follower bearings 168 run in the slot 110 between the cam tracks 96. Lugs 172 project from the respective ratchet arm collars in the opposite direction to the respective ratchet arms.

Referring to FIGS. 7 and 8, each shell 90A, 90B of the housing 44 is formed with two internally threaded bores 176 and 178 and a cartridge 180, having a spring-loaded rod 182 captive therein, is fitted in the bore 176. The rods 182 engage the lugs 172 and bias the arms 160 to the positions in which the cam follower bearings 168A, 168B run against the two cam tracks 96A, 96B respectively.

In the following description of the transmission of drive from the feed collet 52 to the lead screw nut 158, references to the direction of rotation of an element about the axis of the feed shaft 114 relate to the element when seen in the direction of the arrow 150 in FIG. 6.

The clutch 122A allows counter-clockwise rotation of the bushing 118A relative to the housing 44, but prevents clockwise rotation of the bushing 118A. Conversely, the clutch 122B permits clockwise rotation of the drive bushing 118B but prevents counter-clockwise rotation of the drive bushing 118B.

The clutch 164A allows the ratchet arm 160A to rotate clockwise relative to the drive bushing 118, but prevents counter-clockwise rotation of the ratchet arm 160A relative to the bushing 118A. Similarly, the clutch 164B allows the ratchet arm 160B to rotate in the counter-clockwise direction relative to the bushing 118B, but prevents clockwise rotation of the ratchet arm 160B relative to the bushing 118B.

In operation of the boring machine, the feed shaft 114 is moved to one axial position or the other, depending upon the desired feed direction, and power is supplied to the rotational drive assembly. As the boring bar rotates, the feed collet 52 also rotates, and rotational movement of the feed collet is converted to a rocking motion of the ratchet arms about the axis of the feed shaft 114 as the rods 182 urge the bearings 168A, 168B against the tracks 96A, 96B respectively.

If, for example, the feed shaft is moved to the position in which the dowel pin 138A engages the slot 134A of the drive bushing 118A, the rocking motion of the ratchet arm 160A is coupled to the feed shaft 114 and the feed shaft rotates in the counter-clockwise direction in stepwise fashion. Reverse rotation due to any torque that might be applied to the feed shaft is prevented by the clutch 164A. Similarly, if the feed shaft is moved to the position in which the dowel pin 138B engages the slot 134B in the drive bushing 118B, the feed shaft rotates stepwise in the clockwise direction. The gears 154, 160 convert rotation of the feed shaft 114 to rotation of the lead screw nut 158. Consequently, the axial feed assembly is displaced toward (or away from) the rotational drive assembly, depending on the position of the shaft 114.

A feed rate control screw 186 is fitted in the bore 178 of each shell of the housing 44. The feed rate control screw 186 projects at its inner end toward the lug of the corresponding ratchet arm, and is provided at its outer end with a knurled head. A compression spring 192 ensures that the feed rate control screw 186 does not turn due to vibration. The screw 186 is hollow, and a plunger 194 is slidably fitted inside the screw. The lug 172 limits movement of the plunger 194 into the housing 90, and a snap ring 200 on the pin limits its movement out of the housing. Engagement of the lug 172 against plunger 194 limits the range of angular movement of the ratchet arm under the bias applied through the pin 182. When the screw 186 is advanced into the housing, the inner end of the plunger 194 engages the lug of the ratchet arm and tilts the ratchet arm away from its bias position. This reduces the angular travel of the ratchet arm and consequently the angle through which the feed shaft 114 rotates on each stroke of the ratchet arm. Similarly, when the screw 186 is retracted, it allows a greater angular travel of the ratchet arm. In this manner, the axial feed rate in the direction controlled by the particular feed rate control screw is adjustable. Since the two feed rate control screws are independently adjustable, the feed rates in the two possible feed directions are themselves independently adjustable.

Figure 2:
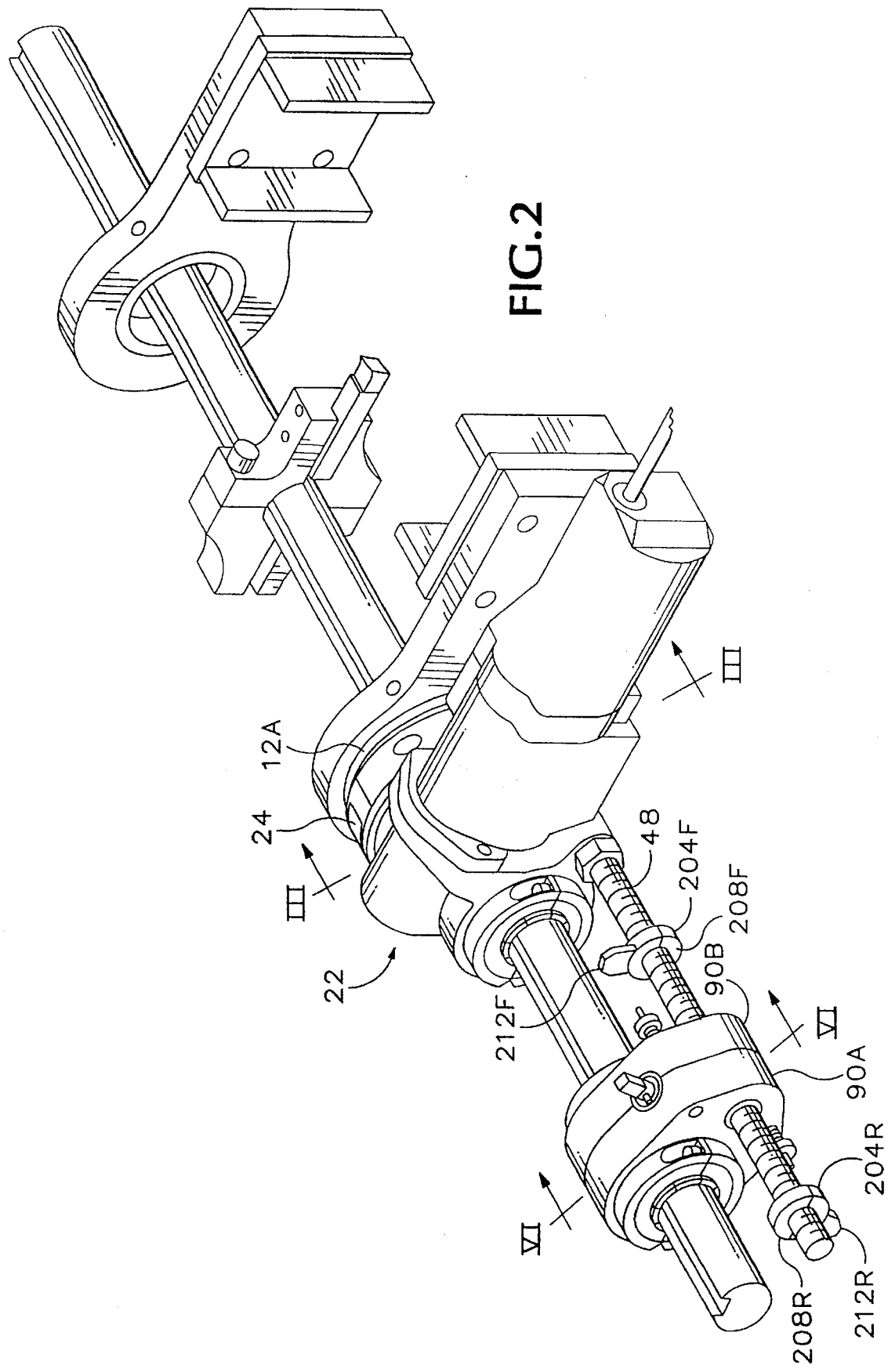
FIG. 2 is a perspective view of a portable boring machine embodying the present invention.

Referring to FIG. 2, two feed stops 204F, 204R are mounted on the lead screw 48 so that the axial feed assembly is between the two feed stops. Each feed stop 204 includes a ring 208 that is internally threaded, so that the feed stop can be moved to a desired position along the lead screw by rotation about the lead screw, and an arm 212 that projects radially from the ring.

For movement of the axial feed assembly toward the workpiece, the feed stop 204F is active, whereas for movement away from the workpiece, the feed stop 204R is active. As the axial feed assembly is displaced along the lead screw, and the tool head moves through the workpiece, the axial feed assembly moves toward the active feed stop. When the axial feed assembly reaches the active feed stop arm, the plunger 194 engages the arm 212 of the active feed stop and is displaced longitudinally relative to the housing 44. The inner end of the plunger 194 engages the lug 172 that projects from the ratchet arm, and thereby forces the ratchet arm to pivot against the bias applied by the pin 182, reducing the feed rate. Over several strokes of the ratchet arm, the action of the plunger 194 against the lug 172 reduces the feed rate to zero. The drive connection between the feed collet 52 and the lead screw nut 158 is thereby disengaged, and further axial movement of the boring bar is prevented. This ensures that the feed range of the boring machine is properly limited, and avoids damage to the boring machine and to the workpiece.

It will be appreciated that the invention is not restricted to the particular embodiment that has been described, and that variations may be made therein without departing from the scope of the invention as defined in the appended claims and equivalents thereof.

I claim:

1. A machine tool comprising:

a mounting member for attachment to a workpiece, the mounting member including a bearing portion that has an external surface of circular cross section and is formed with at least one aperture in its external surface, and a utility device having an internal peripheral surface that defines a cylindrical cavity for receiving the bearing portion of the mounting member in a manner that allows the utility device to move axially and rotationally relative to the mounting member, a clamp means actuable when the utility device is fitted to the bearing portion of the mounting member for releasably retaining the utility device against axial and rotational movement relative to the bearing portion, and at least one spring-loaded detent member that projects into the cylindrical cavity from said peripheral surface and is receivable in the aperture of the bearing portion for retaining the operating assembly against axial and rotational movement relative to the bearing portion in the event that the clamp means is not actuated.

2. A machine tool according to claim 1, wherein the bearing portion of the mounting member is formed with at least two apertures in its external surface, the apertures being angularly spaced about the external surface.

3. A machine tool according to claim 2, wherein the bearing portion is formed with four equiangularly spaced apertures.

4. A machine tool according to claim 3, wherein the utility device comprises first and second spring-loaded detent members that project into the cylindrical cavity from said peripheral surface at a different angular spacing from the apertures, each of the detent members being receivable in any of the apertures of the bearing portion for retaining the utility device against axial and rotational movement relative to the bearing portion in the event that the clamp means is not actuated.

5. A machine tool according to claim 1, wherein the mounting member is generally cylindrical and defines a central axis, the external surface of the bearing portion is spherical and has a center of curvature that lies on the central axis of the mounting member, and the aperture is an elongate slot of which the longitudinal extent is parallel to the central axis of the mounting member.

6. A machine tool according to claim 1, wherein the utility device comprises first and second spring-loaded detent members that project into the cylindrical cavity from said peripheral surface and each of which is receivable in the aperture of the bearing portion for retaining the utility device against axial and rotational movement relative to the bearing portion in the event that the clamp means is not actuated.

7. A machine tool for boring out a hole in a workpiece, comprising:

a boring bar, at least one mounting member for attachment to the workpiece to support the boring bar, the mounting member being generally cylindrical and defining a passage for receiving the boring bar, and including a bearing portion that has an external surface of circular cross section and is formed with at least one aperture in its external surface, and a rotational drive assembly including a motor in driving engagement with the boring bar, an attachment portion having an internal peripheral surface that defines a cylindrical cavity for receiving the bearing portion of the mounting member in a manner that allows the attachment portion to move axially and rotationally relative to the mounting member, a clamp means actuable when the attachment portion is fitted to the bearing portion of the mounting member for releasably retaining the attachment portion against axial and rotational movement relative to the bearing portion, and at least one spring-loaded detent member that projects into the cylindrical cavity from said peripheral surface and is receivable in the aperture of the bearing portion for retaining the attachment portion against axial and rotational movement relative to the bearing portion in the event that the clamp means is not actuated.

8. A machine tool according to claim 7, wherein the rotational drive assembly further comprises a housing in which a drive collet is mounted in a manner that allows the drive collet to rotate relative to the housing while preventing relative axial movement of the drive collet and housing, a key means that allows relative axial movement of the drive collet and the boring bar while preventing relative rotational movement thereof, and a means securing the attachment portion to the housing, and wherein the motor is attached to the housing and coupled to the drive collet to drive the collet to rotate relative to the housing.

9. A machine tool according to claim 7, wherein the bearing portion of the mounting member is formed with four apertures in its external surface, the apertures being equiangularly spaced about the external surface, and the rotational drive assembly comprises first and second spring-loaded detent members that project into the cylindrical cavity from said peripheral surface at a different angular spacing from the apertures, each of the detent members being receivable in any of the apertures of the bearing portion for retaining the attachment portion against axial and rotational movement relative to the bearing portion in the event that the clamp means is not actuated.

10. A machine tool according to claim 7, wherein the mounting member is generally cylindrical and defines a central axis, the external surface of the bearing portion is spherical and has a center of curvature that lies on the central axis of the mounting member, and the aperture is an elongate slot of which the longitudinal extent is parallel to the central axis of the mounting member.

11. A portable machine tool comprising:

a bar having a central axis, a rotational drive assembly effective between the bar and a mechanical ground for rotating the bar about said axis, an axial feed assembly mounted on the bar in a manner that prevents relative axial movement, said axial feed assembly including a housing, a drive member that is mounted in the housing and is held against axial movement relative to the housing and rotational movement relative to the bar, an output member that is rotatable in the housing about an axis that is parallel to the bar and is held against axial movement relative to the housing, and a means for converting relative rotational movement of the bar and the axial feed assembly into rotational movement of the output member in the housing, a coupling member effective between the mechanical ground and the axial feed assembly, the coupling member being drivingly engaged by the output member whereby relative axial movement of the axial feed assembly and the rotational drive assembly is effected in response to relative rotational movement of the bar and the axial feed assembly, an axial feed stop at a selected position along the coupling member, and a means responsive to the axial feed stop for disconnecting the coupling between the bar and the output member.

12. A machine tool according to claim 11, wherein the means for converting relative rotational movement of the bar and the axial feed assembly into rotational movement of the output member housing comprises a feed shaft that is rotatable about an axis thereof, a ratchet arm mounted on the feed shaft in a manner that allows relative rotational movement of the feed shaft and the ratchet arm in a first sense but prevents relative rotational movement in a second sense, and means coupling the ratchet arm to the boring bar for effecting oscillatory rotational movement of the ratchet arm about the axis of the feed shaft, and wherein the means responsive to the axial feed stop comprises a plunger for urging the ratchet arm to an equilibrium position, in which it is out of engagement with the boring bar, when engaging the axial feed stop.

13. A portable machine tool according to claim 11, wherein the axial feed assembly comprises a feed adjustment mechanism.

14. A portable machine tool according to claim 13, wherein the feed adjustment mechanism comprises a screw, and the means responsive to the axial feed stop comprises a plunger that extends coaxially with the screw.

15. A portable machine tool according to claim 11, comprising a second axial feed stop, and wherein the axial feed assembly is positioned between the two feed stops, whereby range of movement of the axial feed assembly along the coupling member is restricted to the range between the two feed stops.

16. A machine tool according to claim 1, wherein the utility device comprises first and second angularly-spaced, spring-loaded detent members that project into the cylindrical cavity from said peripheral surface and either of which is receivable in the aperture of the bearing portion for retaining the utility device against axial and rotational movement relative to the bearing portion in the event that the clamp means is not actuated.

17. A machine tool according to claim 16, wherein the bearing surface is formed with at least two angularly-spaced apertures and the first and second spring-loaded detent members are angularly spaced at a different angle from the apertures, each of the detent members being receivable in any of the apertures of the bearing portion for retaining the utility device against axial and rotational movement relative to the bearing portion in the event that the clamp means is not actuated.

18. A machine tool according to claim 16, wherein the bearing surface is formed with four equiangularly-spaced apertures and the first and second spring-loaded detent members are spaced at an angle of 30°.

19. A machine tool according to claim 7, wherein the rotational drive assemby comprises first and second angularly-spaced, spring-loaded detent members that project into the cylindrical cavity from said peripheral surface and either of which is receivable in the aperture of the bearing portion for retaining the rotational drive assembly against axial and rotational movement relative to the bearing portion in the event that the clamp means is not actuated.

20. A machine tool according to claim 19, wherein the bearing surface is formed with at least two angularly-spaced apertures and the first and second spring-loaded detent members are angularly spaced at a different angle from the apertures, each of the detent members being receivable in any of the apertures of the bearing portion for retaining the rotational drive assembly against axial and rotational movement relative to the bearing portion in the event that the clamp means is not actuated.

21. A machine tool according to claim 19, wherein the bearing surface is formed with four equiangularly-spaced apertures and the first and second spring-loaded detent members are spaced at an angle of 30°.

* * * * *